(12) United States Patent
Saito et al.

(10) Patent No.: US 7,583,580 B2
(45) Date of Patent: Sep. 1, 2009

(54) OPTICAL RECORDING MEDIUM AS WELL AS OPTICAL RECORDING AND REPRODUCTION METHOD

(75) Inventors: Kimihiro Saito, Saitama (JP); Takeshi Yamasaki, Kanagawa (JP); Ariyoshi Nakaoki, Tokyo (JP)

(73) Assignee: Sony Corporation, Tokyo (JP)

( * ) Notice: Subject to any disclaimer, the term of this patent is extended or adjusted under 35 U.S.C. 154(b) by 489 days.

(21) Appl. No.: 11/382,975

(22) Filed: May 12, 2006

(65) Prior Publication Data

US 2006/0256695 A1    Nov. 16, 2006

(30) Foreign Application Priority Data

May 12, 2005   (JP)  ............................ P2005-139988
Feb. 21, 2006   (JP)  ............................ P2006-044303

(51) Int. Cl.
  *G11B 7/00*  (2006.01)
(52) U.S. Cl. ............................ 369/112.23; 369/112.24; 369/275.5; 369/283; 369/286; 369/288
(58) Field of Classification Search ............... None
See application file for complete search history.

(56) References Cited

U.S. PATENT DOCUMENTS

| 6,815,034 B2* | 11/2004 | Chang et al. ............ 428/64.1 |
| 2002/0054974 A1* | 5/2002 | Takahashi et al. ......... 428/64.4 |
| 2006/0012885 A1* | 1/2006 | Beder et al. ............ 359/649 |

FOREIGN PATENT DOCUMENTS

JP          5-189796         7/1993

OTHER PUBLICATIONS

Ichimura et al.; Near-Field Phase-Change Optical Recording of 1.36 Numerical Aperture; Japanese Journal of Applied Physics, vol. 39, pp. 962-967; 2000.
M. Shinoda et al.; High Density Near-Field Optical Disc Recording; Digest of ISOM2004, We-E-03.
M. Furuki et al.; Progress in Electron Beam Mastering of 100Gb/inch2 Density Disc; Japanese Journal of Applied Physics, vol. 43, pp. 5044-5046; 2004.
K. Saito et al.; A Simulation of Magneto-Optical Signals in Near-Field Recording; Japanese Journal of Applied Physics, vol. 38, pp. 6743-6749; 1999.
C.A. Verschuren et al.; Towards cover-layer incident read-out of a dual-layer disc with a NA=1.5 solid immersion lens; Digest of ISOM2004, We-E-05.

* cited by examiner

*Primary Examiner*—Wayne R Young
*Assistant Examiner*—Brian Butcher
(74) *Attorney, Agent, or Firm*—Sonnenschein Nath & Rosenthal LLP

(57) ABSTRACT

An optical recording medium illuminated by light from a light source as near-field light using a focusing lens whose numerical aperture exceeds 1 to perform recording and/or reproduction is provided, wherein a composite layer in which a high refractive index material portion having a refractive index higher than that of a light-transmissible material portion is mixed in the light-transmissible material portion is provided on the surface of a light incident side of the optical recording medium. With an average refractive index of the composite layer being high, a numerical aperture controlled by a refractive index of a surface layer can be made large to obtain higher resolution and higher durability against contact with a lens or the like.

12 Claims, 11 Drawing Sheets

OPTICAL RECORDING MEDIUM AS WELL AS OPTICAL RECORDING AND REPRODUCTION METHOD

CROSS REFERENCES TO RELATED APPLICATIONS

The present invention contains subject matter related to Japanese Patent Application JP 2005-139988 filed in the Japanese Patent Office on May 12, 2005 and Japanese Patent Application JP 2006-044303 filed in the Japanese Patent Office on Feb. 21, 2006, the entire contents of which being incorporated herein by reference.

BACKGROUND OF THE INVENTION

1. Field of the Invention

The present invention relates to an optical recording medium and an optical recording and reproduction method, in which the optical recording medium is illuminated by near-field light to perform recording and/or reproduction.

2. Description of the Related Art

An optical (or magneto-optical) recording medium represented by a CD (Compact Disc), MD (Mini Disc) and DVD (Digital Versatile Disc) is widely used as a storage medium for music information, video information, data, programs and the like. In a system recording to and reproducing from those optical recording media, an objective lens faces a surface of the optical recording medium in a noncontact manner to read minute recording marks by detecting minute concavity and convexity formed on a recording surface of the optical recording medium and detecting reflectivity modified structure of a phase-change material. In the case of a magneto-optical recording method, magnetic domain structure where a Kerr rotation angle is changed is detected to read minute recording marks.

In recent years, since a larger capacity and a higher density are desired in such optical recording media, studies have been made on technologies for forming further smaller recording marks in an optical recording medium and reading the recording marks with high resolution.

When $\lambda$ is a wavelength of illuminating light and NA is a numerical aperture of a focusing lens to focus the light on an optical recording medium, the size of a light spot illuminating the optical recording medium is approximately $\lambda/NA$, and resolution is proportional to the value. The numerical aperture is $$NA = n \times \sin\theta$$

where n is a refractive index of a medium, $\theta$ is an incident angle of a peripheral ray on an objective lens. When the medium is air, NA may not exceed 1 and there is a limit with respect to resolution. Hence, a wavelength of a light source which is, for example, a semiconductor laser has been made shorter and a numerical aperture of a focusing lens has been made larger in an optical recording and reproduction apparatus.

On the other hand, what is called a near-field optical recording and reproduction method of using an evanescent wave that is light exponentially attenuating from an interface is proposed as a method of obtaining a numerical aperture larger than 1. In the near-field optical recording and reproduction method, a gap between a focusing lens and the surface of an optical recording medium may need to be extremely small.

An optical recording and reproduction method using a solid immersion lens (SIL) is proposed as a method in which near-field light illuminates an optical recording medium to perform recording and reproduction (for example, refer to Patent Reference 1 and Non-patent Reference 1).

FIG. 1 shows a schematic constitutional diagram of an example of an optical recording and reproduction apparatus that uses SIL as a near-field light illuminating portion. As shown in FIG. 1, the optical recording and reproduction apparatus includes a light source 20, a collimator lens 21, a beam splitter 22, a polarizing beam splitter 23, a ¼ wavelength plate 24, an optical lens 25 and a near-field light illuminating portion 26 that is SIL in this case, which are disposed on the optical axis in this order. Further, a first light receiving portion 27 is disposed on an optical path of light reflected by the polarizing beam splitter 23, and a second light receiving portion 28 is disposed on an optical path of light reflected by the beam splitter 22. A dashed line C shows the optical axis.

In the optical recording and reproduction apparatus having such structure, light emitted from the light source 20 is made into collimated light by the collimator lens 21, and after passing through the beam splitter 22 and the polarizing beam splitter 23, a phase thereof is advanced by a quarter of the wavelength through the ¼ wavelength plate 24. Then, the light illuminates a recording surface of an optical recording medium 110 as near-field light through the optical lens 25 and the near-field illuminating portion 26 that is SIL, for example.

Return light from the optical recording medium 110 is incident on the polarizing beam splitter 23 through the near-field light illuminating portion 26, the optical lens 25 and the ¼ wavelength plate 24. Since the phase has been advanced by half the wavelength after passing through the ¼ wavelength plate 24 on a forward path and a return path, the return light from the optical recording medium 110 is reflected by the polarizing beam splitter 23 and is received by the first light receiving portion 27.

On the other hand, since the polarization is converted on the edge of SIL, return light totally reflected on the edge of the near-field light illuminating portion 26 that is SIL in this case is transmitted through the polarizing beam splitter 23 and is reflected by the beam splitter 22 to be received by the second light receiving portion 28.

Specifically, in the optical recording and reproduction apparatus shown in FIG. 1, the first light receiving portion 27 detects information recorded on a recording surface of the optical recording medium 110. On the other hand, the second light receiving portion 28 detects the totally reflected return light which changes depending on a distance between the optical recording medium 110 and the near-field light illuminating portion 26 facing the optical recording medium 110. Therefore, distance, that is, a gap between the surface of the optical recording medium 110 and the edge of the near-field light illuminating portion 26 such as SIL can be detected by the amount of return light detected by the second light receiving portion 28.

For example, an optical recording medium 110 of a phase-change recording type, which is used in the aforementioned recording and reproduction apparatus, is proposed as shown in FIG. 2. FIG. 2 is a constitutional diagram schematically showing cross-section of an example of the optical recording medium 110, in which a reflective layer 102 made of Al or the like, a dielectric layer 103 made of $SiO_2$ or the like, a phase-change material layer 104 made of GeSbTe or the like, and a dielectric layer 105 made of $SiO_2$ or the like are sequentially laminated on a substrate 101 made of glass, polycarbonate (PC) or the like. Further, an optical recording medium 110 of a read-only type, which is used in the aforementioned recording and reproduction apparatus, is proposed as shown in FIG. 3. FIG. 3 is a constitutional diagram schematically showing cross-section of another example of the optical recording medium 110, in which a concave-convex pit corresponding to recording information is formed on a substrate 101 made of glass, PC or the like and a reflective layer 102 made of Al or the like is formed thereon (for example, refer to Non-patent References 2 and 3).

In the case where the aforementioned near-field light illuminating portion such as SIL is used, distance between the surface of the near-field light illuminating portion and the surface of an optical recording medium, that is, a gap is desirably equal to or less than one tenth of a wavelength of illuminating light (for example, refer to Non-patent reference 4).

Therefore, in the case where the near-field light illuminating portion such as SIL collides with the surface of the optical recording medium, there is a possibility of causing damages on the part where information is recorded. In order to control or avoid such inconvenience, for example, a structure schematically shown in an cross-sectional structure of FIG. 4 is disclosed in which a protective layer 108 having the thickness of approximately 1 μm or more is provided on the uppermost surface of the information recording surface of the optical recording medium 110 (for example, refer to Non-patent reference 5). In FIG. 4, the same reference numerals are given to portions corresponding to those in FIG. 2, and redundant explanation thereof is omitted.

As shown in FIG. 4, a focal position of light applied by the near-field light illuminating portion 26 is set to be on the surface of the recording and reproduction layer, which is the surface of the phase-change material layer 104 in the example shown in the figure, through the protective layer 108. In addition, in this case also, the gap between the surface of the optical recording medium 110 and the surface of the near-field light illuminating portion 26 made of SIL or the like may need to be approximately one tenth or less of the wavelength of illuminating light.

[Patent Reference 1] Japanese Published Patent Application No. H5-189796

[Non-patent Reference 1] I. Ichimura et al., "Near-Field Phase-Change Optical Recording of 1.36 Numerical Aperture", Japanese Journal of Applied Physics, Vol.39, pp.962-967(2000)

[Non-patent Reference 2] M. Shinoda et al., "High Density Near-Field Optical Disc Recording", Digest of ISOM2004, We-E-03

[Non-patent Reference 3] M. Furuki et al., "Progress in Electron Beam Mastering of 100 Gb/inch2 Density Disc", Japanese Journal of Applied Physics Vol.43, pp.5044-5046 (2004)

[Non-patent Reference 4] K. Saito et al., "A Simulation of Magneto-Optical Signals in Near-Field Recording", Japanese Journal of Applied Physics, Vol.38, pp.6743-6749(1999)

[Non-patent Reference 5] C. A. Verschuren et al., "Towards cover-layer incident read-out of a dual-layer disc with a NA=1.5 solid immersion lens", Digest of ISOM2004, We-E-05

SUMMARY OF THE INVENTION

In the case where the optical recording medium shown in FIG. 4 is used, since the protective layer is provided, an occurrence of damages and stains due to the collision with the near-field light illuminating portion such as SIL can be controlled and avoided, however, disadvantageously the numerical aperture NA may not be made large.

Further explaining the above, the numerical aperture NA in this case is expressed as $$NA = n \times \sin\theta$$

where θ is a maximum incident angle (an internal incident angle formed with an optical axis c) of the near-field light illuminating portion 26 that is SIL in this case and n is a refractive index of the protective layer 108. Specifically, since the numerical aperture NA in this case is obtained by multiplying the refractive index n of the protective layer 108 and sine, the value thereof may not be larger than the refractive index of the protective layer 108.

In order to obtain the mechanical strength capable of enduring collision or the like with the SIL, the thickness of the protective layer may need to be at least submicron or more. In addition, in the case where a layer having approximately submicron thickness is formed, desirably, an organic material capable of being spin-coated is used as the protective layer, because a method such as vapor deposition takes much time for production.

However, a material having sufficiently high refractive index may not be obtained at present among organic materials which are capable of being spin-coated and which have light transmittance suitable for the protective layer of an optical recording medium.

The present invention addresses the above-identified, and other problems associated with conventional methods and apparatuses. It is desirable to provide an optical recording medium which is not easily damaged by contact or the like with a near-field light illuminating portion and with which a desired high numerical aperture can be obtained, and further to provide an optical recording and reproduction method using near-field light, capable of performing stable recording and reproduction using the aforementioned optical recording medium.

According to an embodiment of the present invention, there is provided an optical recording medium illuminated by light from a light source as near-field light using a focusing lens whose numerical aperture exceeds 1 to perform recording and/or reproduction, wherein a composite layer in which a high refractive index material portion having a refractive index higher than that of a light-transmissible material portion is mixed with the light-transmissible material portion is provided on the surface of a light incident side of the optical recording medium.

Further, in the optical recording medium according to an embodiment of the present invention, refractive index n1 of the high refractive index material portion is $$n1 > NA$$

with respect to a numerical aperture NA of a focusing lens.

Furthermore, in the optical recording medium according to an embodiment of the present invention, a homogeneous layer having uniform refractive index is provided between the composite layer and a recording layer of the optical recording medium.

Moreover, an optical recording and reproduction method according to an embodiment of the present invention is the optical recording and reproduction method in which light from a light source illuminates an optical recording medium as near-field light using a focusing lens whose numerical aperture exceeds 1 to perform recording and/or reproduction, wherein the optical recording medium according to an embodiment of the present invention is used.

As heretofore described, an optical recording medium according to an embodiment of the present invention includes a composite layer, in which a high refractive index material portion made of a high refractive index material is mixed with the light-transmissible material portion, on the surface of a light incident side of the optical recording medium. With such structure, the composite layer functions as the protective layer, so that damages and stains due to the collision and the like with the near-field light illuminating portion such as SIL is prevented without fail and the durability can be secured. Further, since the high refractive index material portion is mixed into the composite layer, an average refractive index of the whole composite layer can be higher than the case where the light-transmissible material portion is made of a single material, in other words, the refractive index can be made higher than that of a protective layer of related art. Accordingly, since the numerical aperture NA is expressed as $$NA = nc \times \sin\theta$$

where, as described above, $\theta$ is a maximum incident angel of the near-field light illuminating portion such as SIL and nc is an average refractive index of the composite layer, the numerical aperture NA can be made larger in comparison to that in related art and so stable recording and reproduction with high resolution can be obtained.

Further, particularly when the refractive index n1 of the high refractive index material portion is larger than the numerical aperture NA of the focusing lens, an average refractive index of the whole composite layer can be practically the same level as the numerical aperture NA or larger than that, and the near-field optical recording and reproduction can be performed with higher resolution.

Furthermore, since the homogeneous layer having a uniform refractive index is provided between the composite layer and the recording layer of the optical recording medium, fluctuation of a wave front in the vicinity of the focal position of light illuminating the recording portion of the optical recording medium can be prevented. Accordingly, the near-field optical recording and reproduction can be performed with desired resolution in the optical recording medium according to an embodiment of the present invention.

As heretofore explained, according to embodiments of the optical recording medium and the optical recording and reproduction method of the present invention, durability of an optical recording medium can be secured against contact with the near-field light illuminating portion, and the near-field optical recording and reproduction can be performed with high optical resolution.

DESCRIPTION OF THE PREFERRED EMBODIMENTS

Embodiments of the present invention are hereinafter explained, however, the present invention is not limited thereto.

Figure 5:
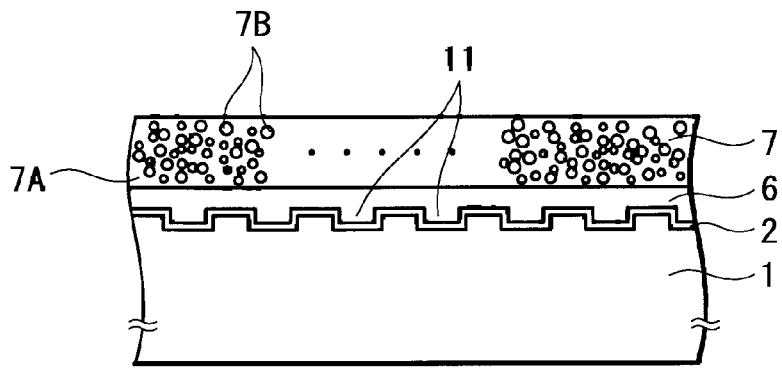
FIG. 5 is a schematic constitutional diagram showing a section of an optical recording medium according to an embodiment of the present invention.
Figure 6:
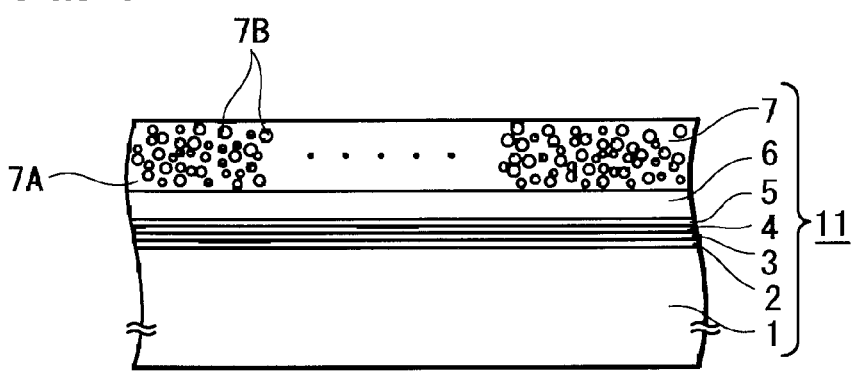
FIG. 6 is a schematic constitutional diagram showing a section of an optical recording medium according to an embodiment of the present invention.
Figure 7:
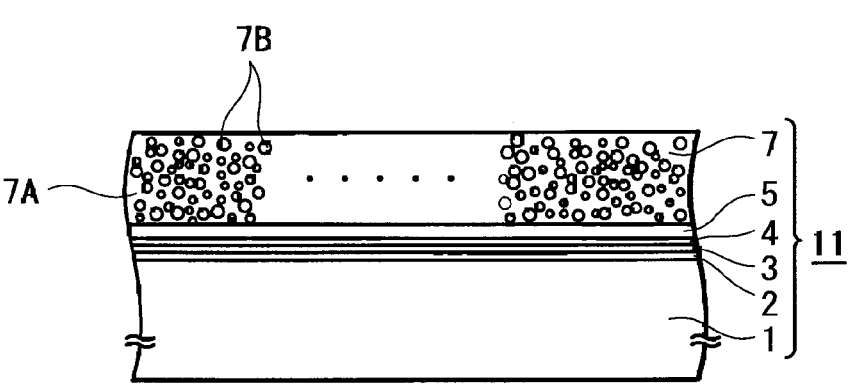
FIG. 7 is a schematic constitutional diagram showing a section of an optical recording medium according to an embodiment of the present invention.

FIGS. 5 to 7 are constitutional diagrams schematically showing a section of the optical recording medium according to embodiments of the present invention. An optical recording medium 10 according to an embodiment of the present invention is illuminated by light from a light source as near-field light through a focusing lens whose numerical aperture exceeds 1 to perform recording and/or reproduction, and a composite layer 7 in which a high refractive index material portion 7B made of a material having a refractive index higher than that of a light-transmissible material portion 7A is mixed in the light-transmissible material portion 7A is provided on the surface of a light incident side thereof.

When a material whose refractive index n1 is $$n1 > NA$$

is used as the material of the high refractive index material portion 7B, where NA is a numerical aperture of the focusing lens through which optical recording medium 10 is illuminated by near-field light to perform recording and/or reproduction, an average refractive index of the whole composite layer 7 can be made higher.

In addition, the high refractive index material portion 7B may be formed of particles. When the material is particulate, advantageously, fluctuation of a wave front of light passing through the composite layer 7 can be controlled by making an average diameter of the particles smaller in comparison to a wavelength of light illuminating the optical recording medium 10.

FIG. 5 shows an embodiment in which a concave-convex pit corresponding to recording information is provided as a recording portion 11 on a substrate 1 made of glass, PC or the like and a reflective layer 2 made of Al or the like is provided thereon. In the embodiment shown in this figure, a homogeneous layer 6 having a uniform refractive index is provided between the composite layer 7 and the recording portion 11 of the optical recording medium 10.

In addition, needless to say, the optical recording medium 10 according to an embodiment of the present invention can be applied not only to an optical recording medium of what is called a read-only type in which a concave-convex pit is formed as a recording portion but also to optical recording media of a recordable type, a write-once type and other types.

For example, as shown in FIG. 6, the present invention can be applied to an optical recording medium 10 of a phase-change type. In this case, a reflective layer 2 made of Al or the like is formed on a substrate 1, then a dielectric layer 3 made of $SiO_2$ or the like, a phase-change material layer 4 made of GeSbTe or the like, and a dielectric layer 5 made of $SiO_2$ or the like are sequentially laminated to form a recording portion 11, and further a homogeneous layer 6 and a composite layer 7 having similar structures to those in FIG. 5 may be provided thereon.

Furthermore, as shown in FIG. 7, for example, the optical recording medium 10 of a phase-change type may have a structure in which the composite layer 7 is provided directly on the dielectric layer 5 of the recording portion 11 without the homogeneous layer 6 being provided.

Figure 1:
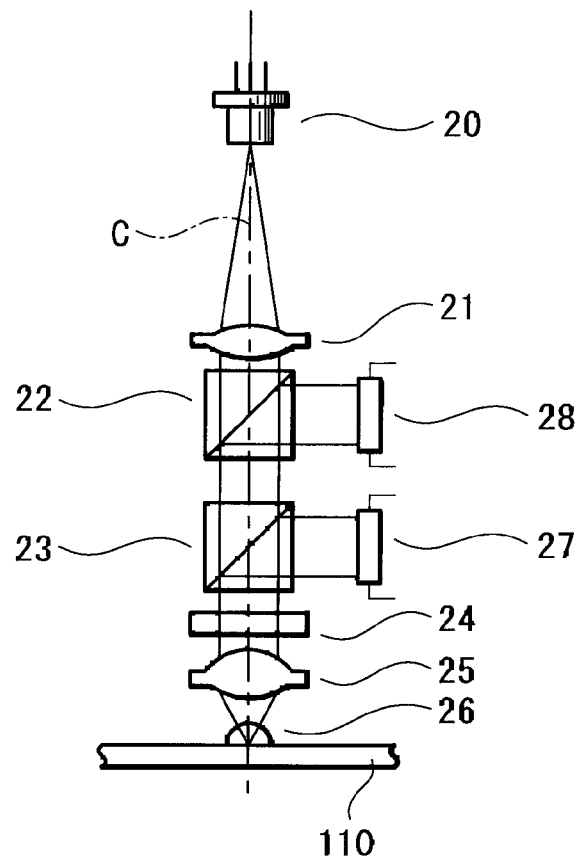
FIG. 1 is a schematic constitutional diagram showing an example of an optical recording and reproduction apparatus that uses near-field light.
Figure 2:
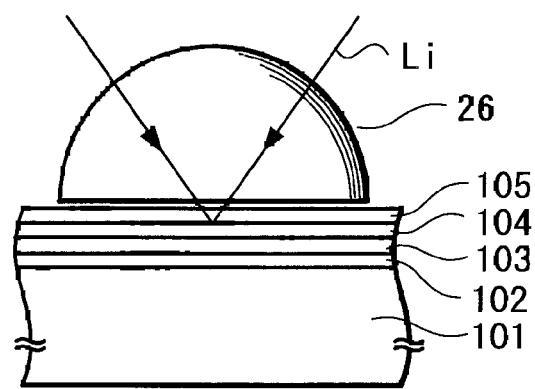
FIG. 2 is a schematic constitutional diagram showing an example of a section of an optical recording medium that uses near-field light.
Figure 3:
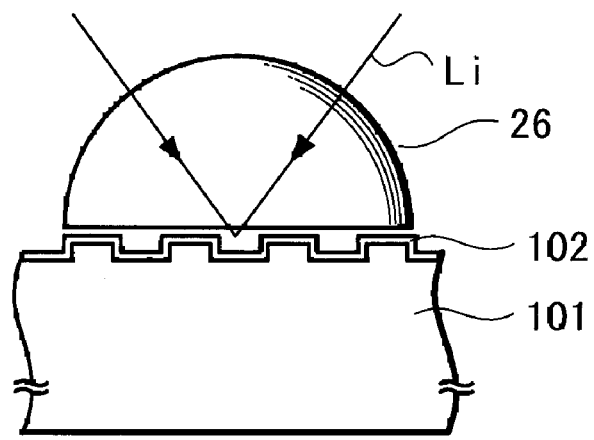
FIG. 3 is a schematic constitutional diagram showing an example of a section of an optical recording medium that uses near-field light.
Figure 4:
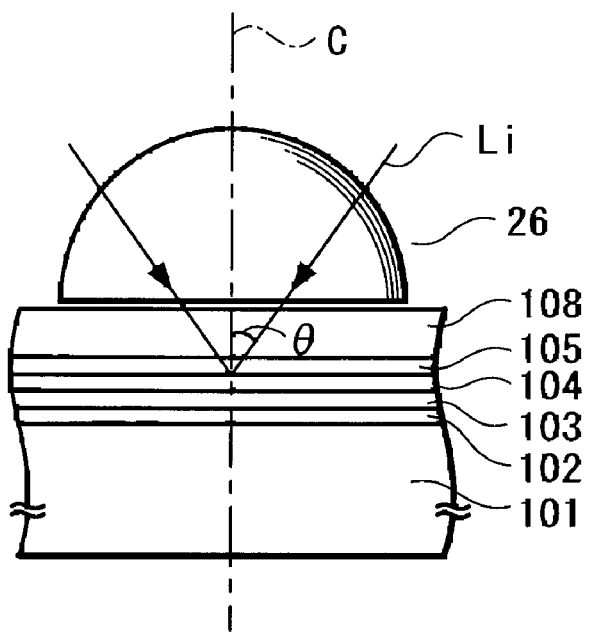
FIG. 4 is a schematic constitutional diagram showing an example of a section of an optical recording medium that uses near-field light.

For example, studies have been made regarding the case where the optical recording and reproduction apparatus explained in FIG. 1 in which near-field light is applied to perform recording and/or reproduction is used, and the optical recording medium according to an embodiment of the present invention is illuminated by the near-field light.

In this example, a wavelength of light incident on the optical recording medium 10 is 405 nm and a focusing lens having a numerical aperture NA of 1.7 such as an optical lens and the SIL is used as the focusing lens to illuminate the optical recording medium 10 with the near-field light. The optical recording medium 10 includes on the surface the composite layer 7 made of the light-transmissible material portion 7A having a refractive index n2 of 1.55 that is mixed with the high refractive index material portion 7B made of $TiO_2$ microparticles having a refractive index n1 of 2.5.

Specifically, a coating agent is prepared by diluting an acrylic hard coat agent containing $TiO_2$ (manufactured by JSR Corporation, product name "DESOLITE Z7252D", solid component density 45% by weight, $TiO_2$: acrylic resin=75:25 (weight ratio)) with a mixed solvent containing methyl isobutyl ketone and isopropyl alcohol in a weight ratio of 1:1 so that the solid component density of the coating agent becomes 30% by weight.

After the recording portion 11 of the optical recording medium 10 is coated with the coating agent by spin coating, the coating agent is hardened by an ultraviolet ray of 500 mJ/cm² to form the composite layer 7.

In this case, the refractive index n1 of the high refractive index material portion 7B is $$n1 > NA$$

where NA (=1.7) is the numerical aperture of the focusing lens.

When an average particle diameter of the microparticles of the high refractive index material portion 7B is 5 nm and a volume filling rate is 30%, an average refractive index nc can be estimated as follows:

$$nc = \sqrt{((1-0.3) \times n2^2 + 0.3 \times n1^2)}$$
$$= \sqrt{((1-0.3) \times 1.55^2 + 0.3 \times 2.5^2)}$$
$$\approx 1.89$$

where n2 is the refractive index of the light-transmissible material portion 7A.

In this case, focusing light from SIL is incident on the composite layer through an air layer whose thickness is equal to or less than one tenth of the wavelength. Since light going through the composite layer passes through areas whose refractive indices are different, minute change is caused in intensity and wave front.

Figures 8A, 8B:
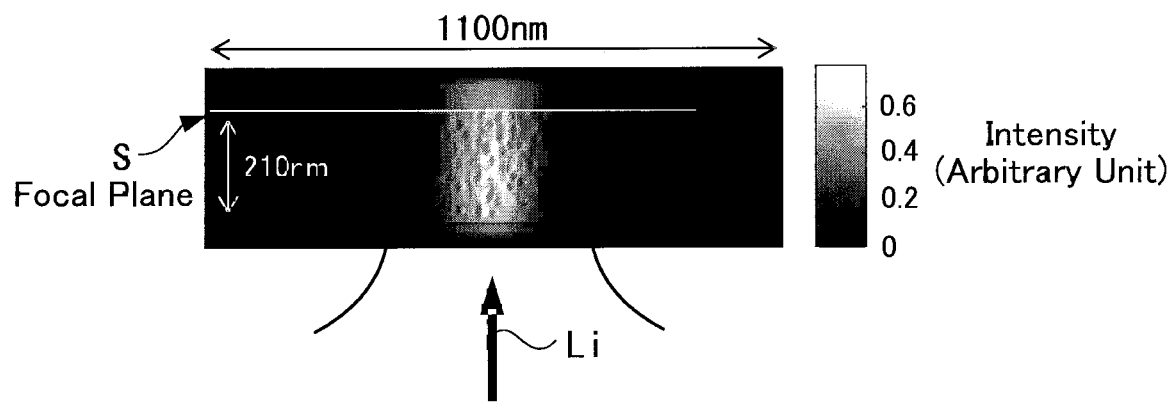
FIG. 8A is a diagram showing intensity distribution of incident light in the depth direction in an optical recording medium according to an embodiment of the present invention.
FIG. 8B is a diagram showing scale of intensity of light amount.
Figures 9A, 9B:
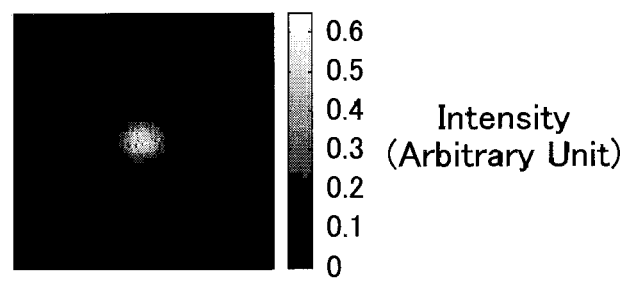
FIG. 9A is a diagram showing an in-plane intensity distribution of incident light in an optical recording medium according to an embodiment of the present invention.
FIG. 9B is a diagram showing scale of intensity of light amount.

FIGS. 8A and 9A are diagrams showing the results of analyzing intensity distribution (amplitude distribution of an electric field) on a section of the light passing through the composite layer and on the focal plane thereof. FIGS. 8B and 9B show the scale of intensity distribution shown in FIGS. 8A and 9A, respectively. In the calculation for analysis, the thickness of the composite layer 7 is 210 nm and all the microparticles of the high refractive index material portion 7B are assumed to have the same diameter (5 nm). Fluctuation of a wave front caused by mixing microparticles is controlled by thus making the average diameter of microparticles equal to or less than one tenth of the wavelength of the incident light, however, intensity varies minutely in each distribution on the section and on the focal plane. Note that the result of study in detail with respect to the average diameter of microparticles is described later on.

Figures 10A, 10B:
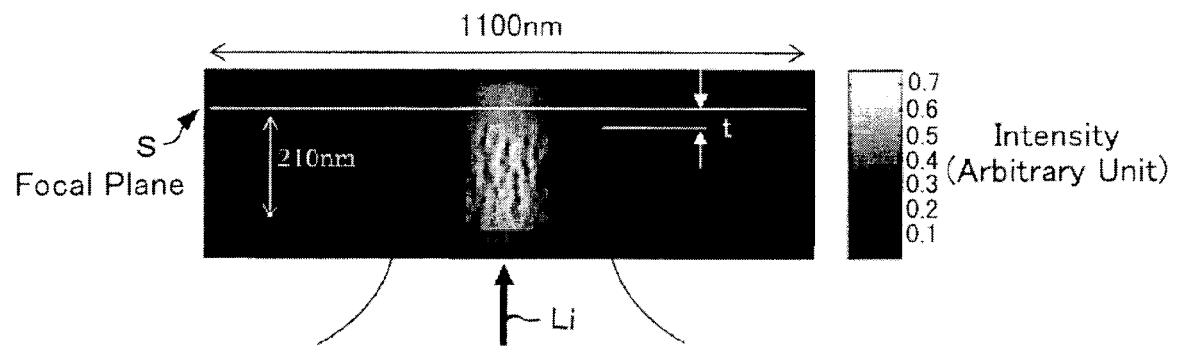
FIG. 10A is a diagram showing intensity distribution of incident light in the depth direction in an optical recording medium according to an embodiment of the present invention.
FIG. 10B is a diagram showing scale of intensity of light amount.
Figures 11A, 11B:
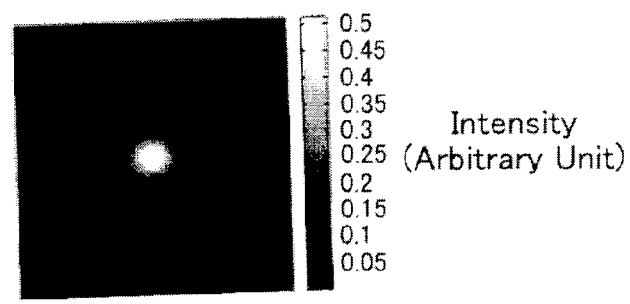
FIG. 11A is a diagram showing an in-plane intensity distribution of incident light in an optical recording medium according to an embodiment of the present invention.
FIG. 11B is a diagram showing scale of intensity of light amount.

FIGS. 10A and 11A are diagrams showing the results of analyzing intensity distribution (amplitude distribution of an electric field) on a section of the light passing through the composite layer 7 and homogeneous layer 6 and on the focal plane thereof, in which as an example for analysis the thickness of the composite layer 7 is 160 nm, the homogeneous layer 6 of about 50 nm having a uniform refractive index is provided between the composite layer 7 and the focal plane in the recording portion 11 of the optical recording medium, and the homogeneous layer 6 is made of the same material as the light-transmissible material portion 7A, that is, made of a homogeneous medium whose refractive index is 1.55. FIGS. 10B and 11B show the scale of intensity distribution shown in FIGS. 10A and 11A, respectively.

When the homogeneous layer 6 is thus provided, intensity varies minutely in the composite layer 7, however, the intensity distribution becomes almost smooth immediately after the light enters the homogeneous layer 6.

Figure 12:
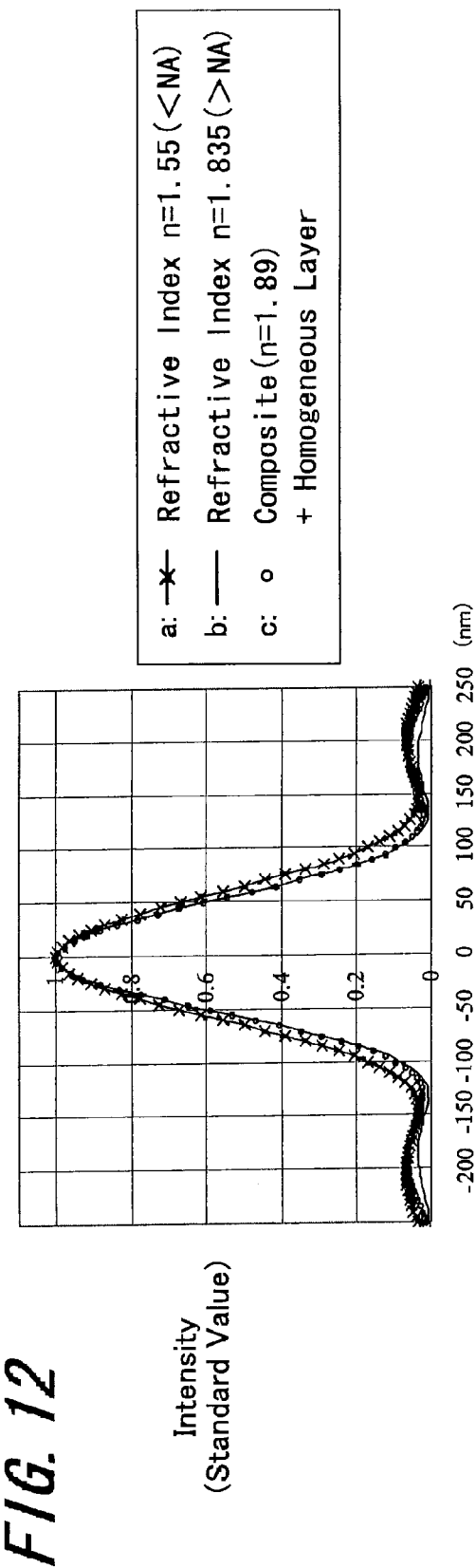
FIG. 12 is a diagram showing light intensity distributions of an optical recording medium according to an embodiment of the present invention and of an optical recording medium according to a comparison example.

FIG. 12 is a diagram showing calculated results of optical intensity distribution on the focal plane of an optical recording medium of a different structure having an optical system similar to each of the above embodiments, specifically, having the numerical aperture NA=1.7.

In FIG. 12, a (x-marks on a solid line) shows optical intensity distribution when light is focused in a homogeneous medium having a refractive index n=1.55 (<NA), and b (solid line only) shows optical intensity distribution when light is focused in a homogeneous medium having a refractive index n=1.835(>NA). In case of a, in other words, with the refractive index n=1.55, due to the refractive index being smaller than the numerical aperture NA and resolution being limited by the value of the refractive index, a spot size becomes large. In FIG. 12, c (O-marks only) shows the example in FIG. 10A described above, that is, intensity distribution on the focal plane of the optical recording medium provided with the composite layer having the average refractive index of 1.89 and the homogeneous layer having the refractive index of 1.55. The example of c (O-marks only) shows smooth distribution similar to the characteristic curve of the refractive index n=1.835 shown by b in FIG. 12, and a similar level of resolution to that of the optical recording medium whose surface is made of the high refractive index material can be obtained.

Hence, as a result, high resolution similar to the case where the surface layer is made of only the high refractive index material can also be obtained when the homogeneous layer is provided in the vicinity of the focal plane to control the fluctuation of wave front on the focal plane.

Figure 13:
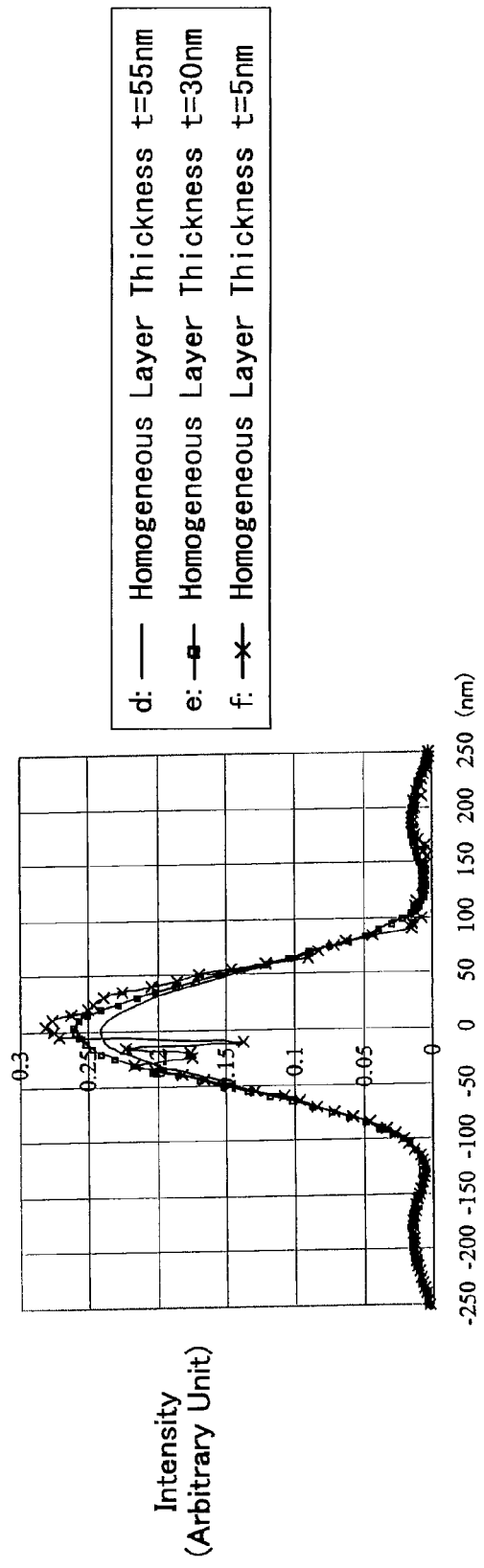
FIG. 13 is a diagram showing light intensity distributions of an optical recording medium according to an embodiment of the present invention and of an optical recording medium according to a comparison example.

FIG. 13 is a diagram showing calculated results of optical intensity distribution on the focal plane in each of optical recording media in which the thickness of a homogeneous layer is altered. Refractive index of homogeneous layer is 1.55 in each example. In FIG. 13, d (solid line only) shows the case in which the thickness t of the homogeneous layer is 55 nm, e (□-marks on a solid line) shows the case in which the thickness t of the homogeneous layer is 30 nm, and f (x-marks on a solid line) shows the case in which the thickness t of the homogeneous layer is 5 nm.

As a result, optical intensity distribution on the focal plane becomes smooth when the thickness of the homogeneous layer is approximately 30 nm or more. Specifically, when the wavelength of the incident light is 405 nm and the refractive index of the homogeneous layer is 1.55, the thickness of 30 nm is roughly one tenth of the wavelength in the homogeneous layer (=405/1.55), which is approximately equivalent to one tenth of the wavelength of light in the homogeneous layer constituting a medium.

Therefore, when a homogeneous layer is provided in the present invention, the thickness thereof is selected to be one tenth or more of a wavelength of light in the homogeneous layer.

Note that, any material having a uniform refractive index is used as the homogeneous layer, and, for example, the material may be the same as that of the dielectric layer on the phase-change material layer in the optical recording medium of the phase-change type having the structure shown in FIG. 7, as described above. Specifically, similar effectiveness can be obtained as long as the thickness of the dielectric layer is equal to or more than one tenth of the wavelength of light in the dielectric layer, and in the case of a structure shown in FIG. 7 in which the composite layer is provided directly on the dielectric layer, optical intensity distribution on the focal plane can also be smoothed, so that near-field optical recording and reproduction with desired resolution can be performed.

An example in which the material having the refractive index of 1.55 is used as the light-transmissible material portion is shown in the above-described embodiment. However, in order to function as the protective layer of the optical recording medium as described above, the light-transmissible material portion may need to have approximately the thickness of submicron or more. Considering productivity when manufacturing an optical recording medium, a resin material and the like that can be manufactured by spin coating or the like are desirably used, and therefore, polymethyl methacrylate having a refractive index of 1.49 and PC having a refractive index of 1.58, for example, can be used.

Further, material for the high refractive index material portion is not limited to the above-described $TiO_2$ having the refractive index of 2.5, and other materials may be used as long as the material has a refractive index higher than the numerical aperture of the focusing lens and has a desirable optical transmittance.

Further, in order to maintain durability against contact and the like on the surface of the optical recording medium 10, the thickness of the composite layer, or the total thickness of the composite layer and the homogeneous layer when the homogeneous layer is provided, is desirably thick, approximately 0.5 μm or more in practice, for example. However, when the thickness is made thick beyond necessity, the spot diameter on the surface of the optical recording medium 10 becomes large and area of the tip of the near-field light illuminating portion 26 made of, for example, SIL that illuminates the medium with near-field light may need to be enlarged. Due to this reason, there is fear that an inclination margin between the near-field light illuminating portion 26 and the optical recording medium 10 may not be secured. Accordingly, the thickness of the composite layer or the total thicknesses of the composite layer and the homogeneous layer is desirably 10 μm or less in practice.

Next, explanation is made on the result of study regarding size of the high refractive index material portion in the above-described composite layer.

Figure 14:
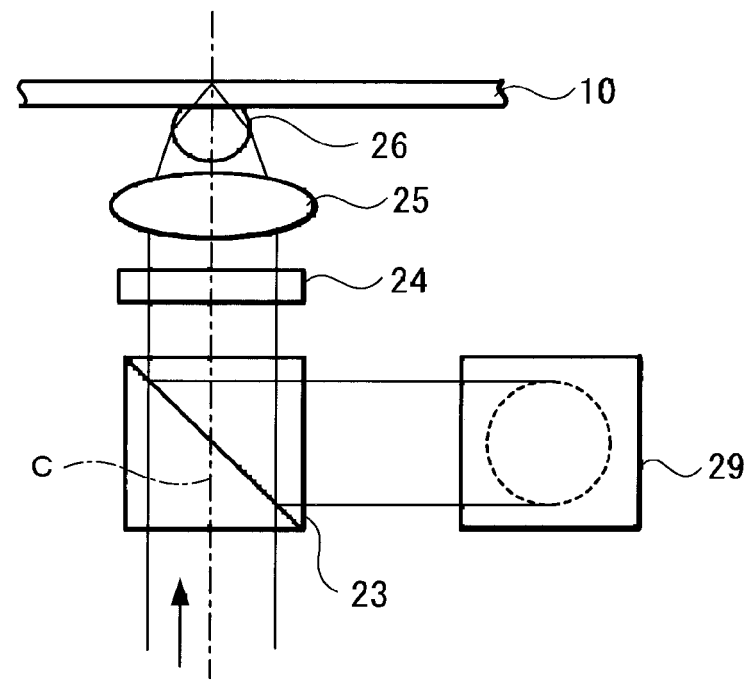
FIG. 14 is a schematic constitutional diagram showing an example of an optical system.

An optical system shown in FIG. 14 is used in the following study example. Specifically, a part of the optical system explained in FIG. 1 is used in which the polarizing beam splitter 23, the ¼ wavelength plate 24, the optical lens 25 and the near-field light illuminating portion 26 that is SIL in this case are disposed in this order on the optical axis. Further, the light receiving portion 29 is disposed on the optical path of light reflected by the polarizing beam splitter 23. The dashed line C shows the optical axis. After light emitted from a light source (not shown in the figure) passes through the polarizing beam splitter 23, the phase thereof is advanced by a quarter of wavelength through the ¼ wavelength plate 24. Then, the light illuminates a recording surface of an optical recording medium 10 as near-field light through the optical lens 25 and the near-field illuminating portion 26 such as SIL. Return light from the optical recording medium 10 is incident on the polarizing beam splitter 23 through the near-field light illuminating portion 26, the optical lens 25 and the ¼ wavelength plate 24. Since the phase is advanced by half the wavelength after passing through the ¼ wavelength plate 24 on a forward path and a return path, return light from the optical recording medium 10 is reflected by the polarizing beam splitter 23 and is received by the light receiving portion 29.

Using the above optical system, calculation is made on light focusing on the reflective layer after passing through the composite layer and returning to the optical lens through the near-field light illuminating portion after again passing through the composite layer, in the optical recording medium shown in FIG. 5. In this example, the reflective layer has no concavity and convexity and has a mirror surface.

Figure 15:
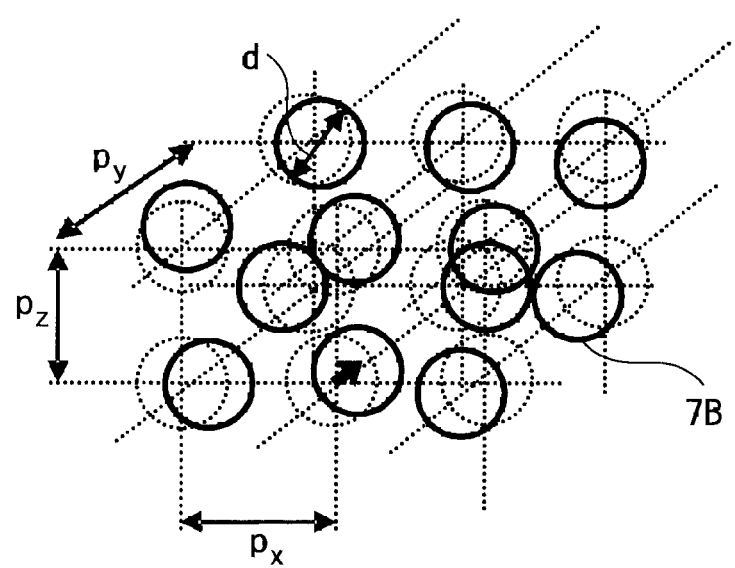
FIG. 15 is an explanatory diagram of parameters of a high refractive index portion used for a calculation example.

FIG. 15 shows parameters of the high refractive index material portion 7B, particles in this case, within the composite layer, which are used in the calculation. When d is the diameter of particles, the particles are disposed at intervals of Px, Py and Pz respectively in two directions in a plane of the composite layer and in a normal direction (optical axis direction) and average dispersion amounts are δx, δy and δz respectively, a first example is:

$d=21$ nm $Px=Py=Pz=28$ nm≈4 $d/3$ $\delta x=\delta y=\delta z=0\pm 7$ nm≈$0\pm d/3$ and a second example is:

$d=70$ nm $Px=Py=Pz=91$ nm≈4 $d/3$ $\delta x=\delta y=\delta z=0\pm 21$ nm≈$0\pm d/3$ In both examples, the wavelength of incident light is 405 nm, and the combined numerical aperture of the optical lens and near-field light illuminating portion is 1.7.

Figure 16:
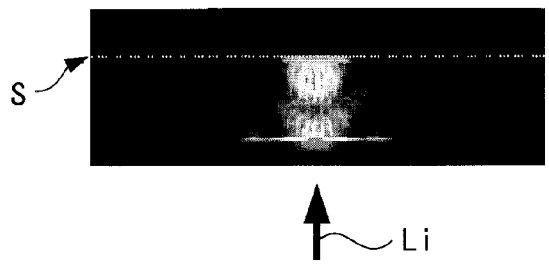
FIG. 16 is a diagram showing amplitude distribution of an electric field in a section of an optical recording medium according to an embodiment of the present invention.
Figure 17:
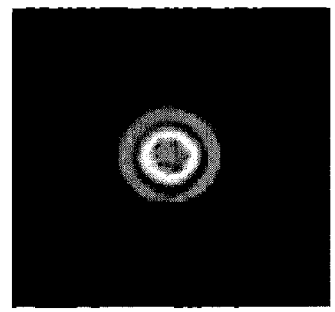
FIG. 17 is a diagram showing amplitude distribution of an electric field in a plane of an optical recording medium according to a comparison example.
Figure 18:
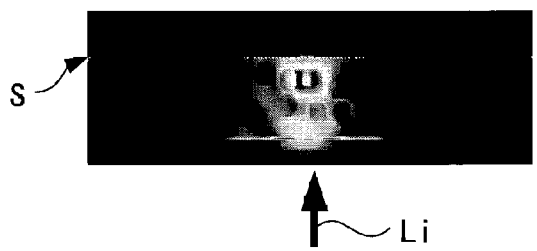
FIG. 18 is a diagram showing amplitude distribution of an electric field in a section of an optical recording medium according to an embodiment of the present invention.
Figure 19:
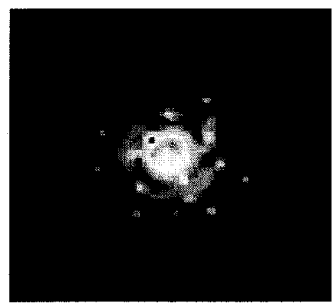
FIG. 19 is a diagram showing amplitude distribution of an electric field in a plane of an optical recording medium according to a comparison example.

FIGS. 16 and 17 show amplitude distribution of an electric field on a section and on a plane in the first example, that is, in the case where the particle size is 21 nm. Further, FIGS. 18 and 19 show amplitude distribution of an electric field on a section and on a plane in the second example, that is, in the case where the particle size is 70 nm. In FIGS. 16 and 18, S denotes the surface of the reflective layer and an arrow Li shows the direction of incident light.

Figure 20:
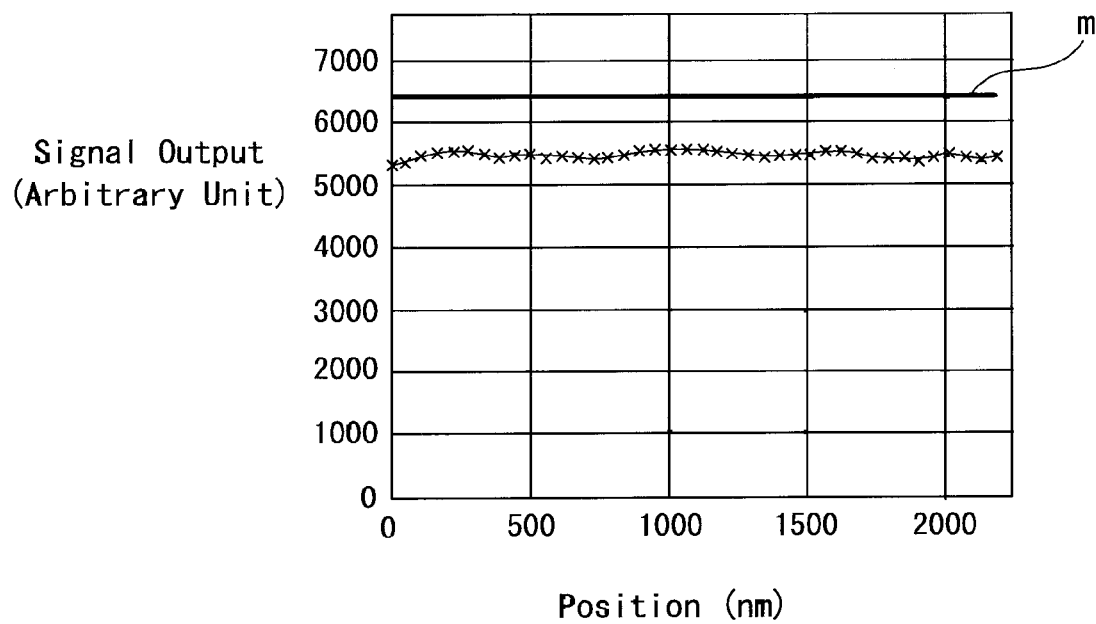
FIG. 20 is a diagram showing signal output of an optical recording medium according to an embodiment of the present invention.
Figure 21:
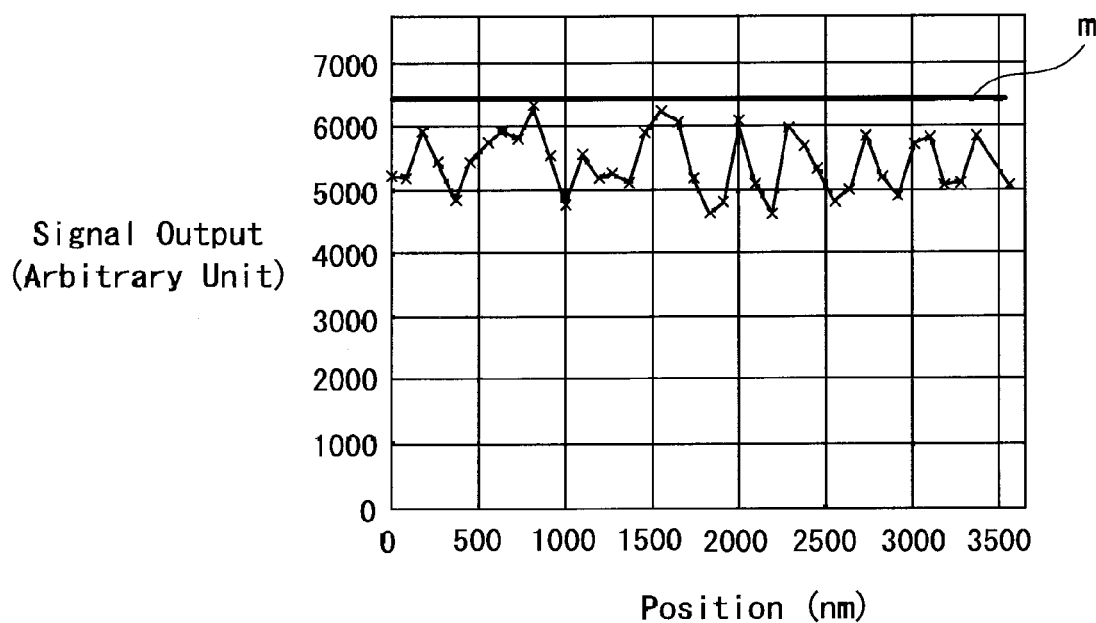
FIG. 21 is a diagram showing signal output of an optical recording medium according to a comparison example.

FIG. 20 shows signal output in the first example, that is, in the case where the particle size is 21 nm, when a light spot passes through the composite layer. FIG. 21 shows signal output in the second example, that is, in the case where the particle size is 70 nm, when a light spot passes through the composite layer. For comparison, a solid line m shows a signal level when the light spot passes through an optical recording medium with a uniform protective layer whose refractive index is almost the same as the average refractive index in the case where the composite layer is provided.

Comparing the results of FIGS. 20 and 21, the noise signal level becomes considerably high when the particle size is large.

Figure 22:
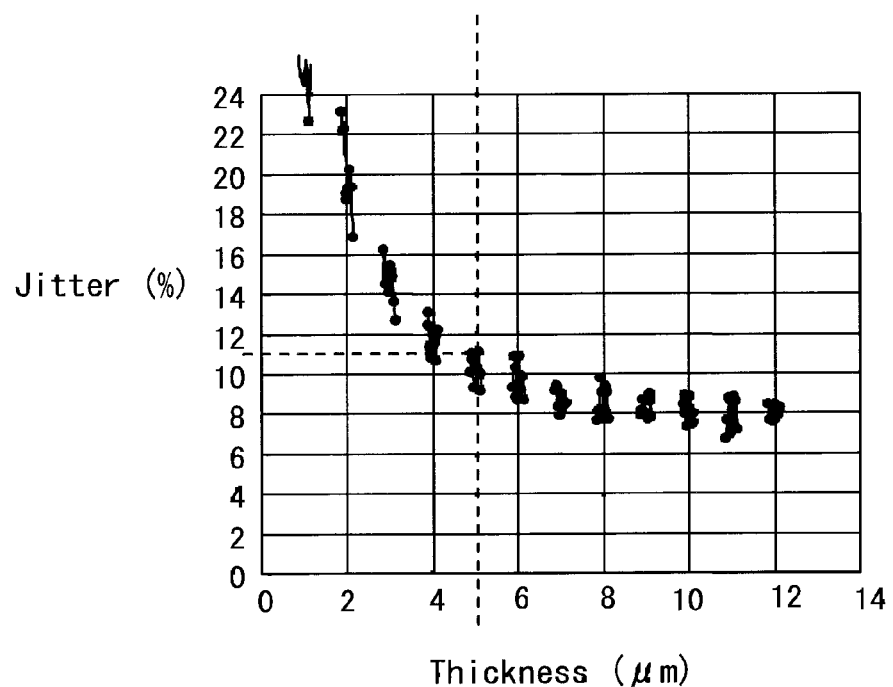
FIG. 22 is a diagram showing jitter of a reproduction signal with respect to an inter-layer thickness between recording layers in a two-layer recording medium.
Figure 23:
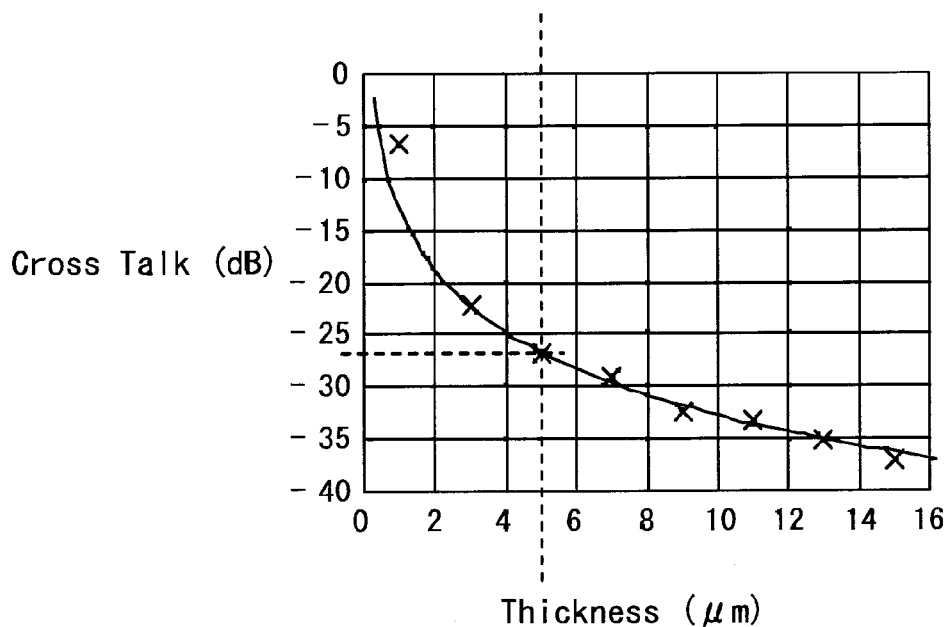
FIG. 23 is a diagram showing cross talk of a reproduction signal with respect to an inter-layer thickness between recording layers in a two-layer recording medium.

In order to know an extent to which the noise signal is allowed, reproduction signal jitter and SNR are calculated with inter-layer thickness between recording layers being altered in an optical recording medium having two recording layers, which is an optical recording medium according to the standard of Blu-ray Disc™ in this case. FIGS. 22 and 23 show the results, respectively.

SNR shows fluctuation of signal power by dB, when signal power obtained from return light that is reflected from a second recording layer on the rear side of a first recording layer is compared to signal power obtained from return light that is reflected from the first recording layer on the front side in two layers. In this case, the signal power obtained from the return light reflected from the second recording layer contains a noise component, because the light incident on the second recording layer and the light reflected therefrom are transmitted through the first recording layer. Reproduction signal jitter shows a deviation in time fluctuation of signal crossing a digitalization threshold level when a random signal is digitalized, that is, (1, 7) modulation is performed, and an error occurs in the digitalization if the value is large.

FIG. 22 shows abrupt deterioration of the reproduction signal jitter when the inter-layer thickness is 5 μm or less and at that time the SNR is −27 dB as shown in FIG. 23.

Figure 24:
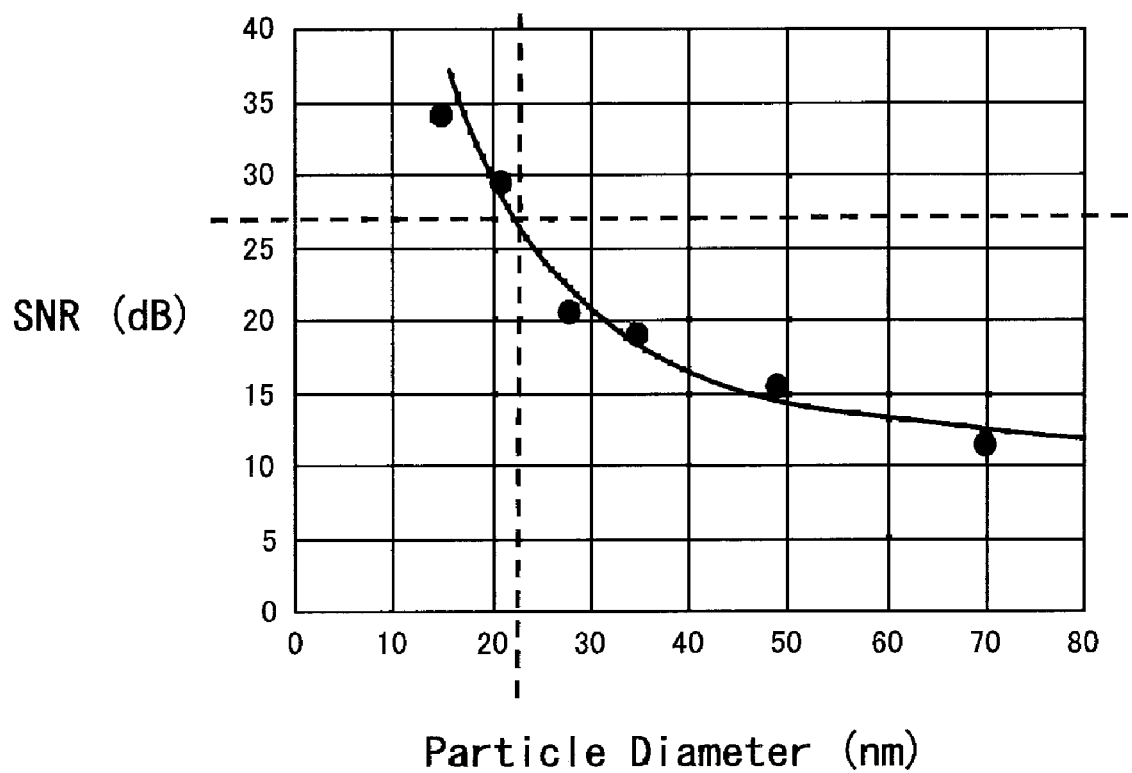
FIG. 24 is a diagram showing SNR with respect to a particle diameter in a composite layer.

Next, FIG. 24 shows the result of calculating SNR, in which calculation similar to FIGS. 20 and 21 is made with the size of particles constituting the high refractive material portion being changed. Since the SNR allowed in digitalization is found to be 27dB or less from the results shown in FIGS. 22 and 23, the particle size may need to be approximately 22 nm or less in order to perform excellent recording and reproduction of a digital signal as is apparent from the calculation result shown in FIG. 24.

An average wavelength of light in the composite layer is obtained by (wavelength in vacuum)/(average refractive index of the composite layer).

In the above example of calculation, the refractive index of the light-transmitting material portion is 1.55, the refractive index of the particle is 2.5 and the volume filling rate of the particle is 0.3, and then an average refractive index Nave is obtained as follows:

$Nave=2.5\times 0.3+1.55\times (1-0.3)=1.835$

Accordingly, the average wavelength of light in the composite layer becomes as follows in this case:

$405/1.835=221$ (nm)

and so making the particle size equal to or less than approximately 22 nm is equivalent to making the particle diameter almost equal to or less than one tenth of the wavelength in the medium. Therefore, a noise signal can be made small to reduce influence on the digitalization of the reproduction signal when the particle size is almost equal to or less than one tenth of the average wavelength in the composite layer even in an optical system having different wavelength of light source, different numerical aperture NA and the like.

In the optical recording medium according to an embodiment of the present invention, as heretofore explained, since the composite layer is provided on the surface of the optical recording medium, in which a high refractive index material portion having comparatively high refractive index, desirably, made of a material having a refractive index higher than the numerical aperture NA of the focusing lens is mixed in the light-transmissible material portion, the average refractive index of the composite layer can be larger compared with a protective layer in an optical recording medium of related art and the refractive index of the surface of the optical recording medium can be higher than the numerical aperture NA of the focusing lens, so that the optical recording medium capable of performing the near-field optical recording and reproduction with high resolution can be provided.

Further, with the composite layer being provided on the surface of the optical recording medium, durability against collision and the like with the near-field light illuminating portion such as SIL can be obtained and the recording portion including a concave-convex pit, a phase-change material and the like can be protected, and therefore the optical recording medium and the optical recording and reproduction method to perform stable near-field optical recording and reproduction can be provided.

Further, when the high refractive index material portion is made of microparticles whose average diameter is smaller than the wavelength of light in the light-transmissible material portion, the fluctuation of the wave front of light propagating through the composite layer can be controlled in the optical recording medium according to an embodiment of the present invention.

Particularly, the high numerical aperture can be obtained and the high density recording and reproduction by the reproduction signal of low noise level can be performed since the influence on the digitalization of the reproduction signal due to the noise signal generated when the light spot passes through the composite layer becomes small by making the diameter of the high refractive index material portion of the particle form or the like equal to or less than one tenth of the average wavelength in the composite layer.

Furthermore, since the homogeneous layer having the uniform refractive index is provided between the composite layer and the recording portion, fluctuation in light intensity distribution is further prevented, high refractive index can be obtained on average, and the light intensity distribution on the focal plane can be made smooth distribution, and so reliable high density recording and reproduction with the high numerical aperture can be performed.

It should be noted that the optical recording medium and the optical recording and reproduction method according to an embodiment of the present invention is not limited to each of the above-described embodiments but as the near-field light illuminating portion, for example, an SIM (Solid Immersion Mirror) can also be used other than the SIL described above, and needless to say, various modifications and alterations can be effected within the scope not departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium configured for recording and reproduction when illuminated by light from a light source as near-field light using a focusing lens whose numerical aperture exceeds 1, comprising:
   a composite layer, in which a high refractive index material portion having a refractive index higher than that of a light-transmissible material portion is mixed in the light-transmissible material portion, provided on the surface of a light incident side of said optical recording medium, wherein a refractive index $n1$ of said high refractive index material portion is $n1 > NA$ with respect to a numerical aperture NA of said focusing lens, said high refractive index material portion is made of particles and an average particle diameter of said particles is equal to or less than one tenth of a wavelength in said composite layer of light that illuminates said optical recording medium, and
   said particles having a particle size of approximately 22 nm or less.

2. The optical recording medium according to claim 1, further comprising:
   a homogeneous layer having a uniform refractive index between said composite layer and a recording portion of said optical recording medium.

3. The optical recording medium according to claim 2, wherein the thickness of said homogeneous layer is equal to or more than one tenth of a wavelength in said homogeneous layer of light that illuminates said optical recording medium.

4. The optical recording medium according to claim 2, wherein the thickness of said composite layer and said homogeneous layer is 0.5 µm or more and 10 µm or less.

5. The optical recording medium according to claim 1, wherein $TiO_2$ microparticles are used as said high refractive index material portion.

6. The optical recording medium according to claim 1, wherein the thickness of said composite layer is 0.5 µm or more and 10 µm or less.

7. The optical recording medium according to claim 1, wherein the optical recording medium is coated with said composite layer by spin coating.

8. An optical recording and reproduction method comprising the steps of:
   illuminating an optical recording medium with light from a light source as near-field light using a focusing lens whose numerical aperture exceeds 1;
   performing at least one of recording and reproduction; and
   providing a composite layer in which a high refractive index material portion having a refractive index higher than that of a light-transmissible material portion is mixed in the light-transmissible material portion on a surface of a light incident side of said optical recording medium, wherein a refractive index $n1$ of said high refractive index material portion is $n1 > NA$ with respect to a numerical aperture NA of said focusing lens,
   said high refractive index material portion is made of particles and an average particle diameter of said particles is equal to or less than one tenth of a wavelength in said composite layer of light that illuminates said optical recording medium, and
   said particles having a particle size of approximately 22 nm or less.

9. The optical recording and reproduction method according to claim 8, wherein a wavelength of light emitted from said light source is approximately 405 nm.

10. The optical recording and reproduction method according to claim 8, wherein the numerical aperture of said focusing lens is 1.7.

11. The optical recording and reproduction method according to claim 8, wherein said focusing lens is configured to have a solid immersion lens.

12. The optical recording and reproduction method according to claim 8, wherein recording and reproduction is performed.

* * * * *